Jan. 23, 1968     A. M. FELSKE     3,364,844

FOOD STEAMER WITH MULTI-LEVEL FOOD SUPPORTING MEANS

Filed May 19, 1966     3 Sheets-Sheet 1

Inventor:
Arthur M. Felske
by Lawrence R. Kempton
Attorney

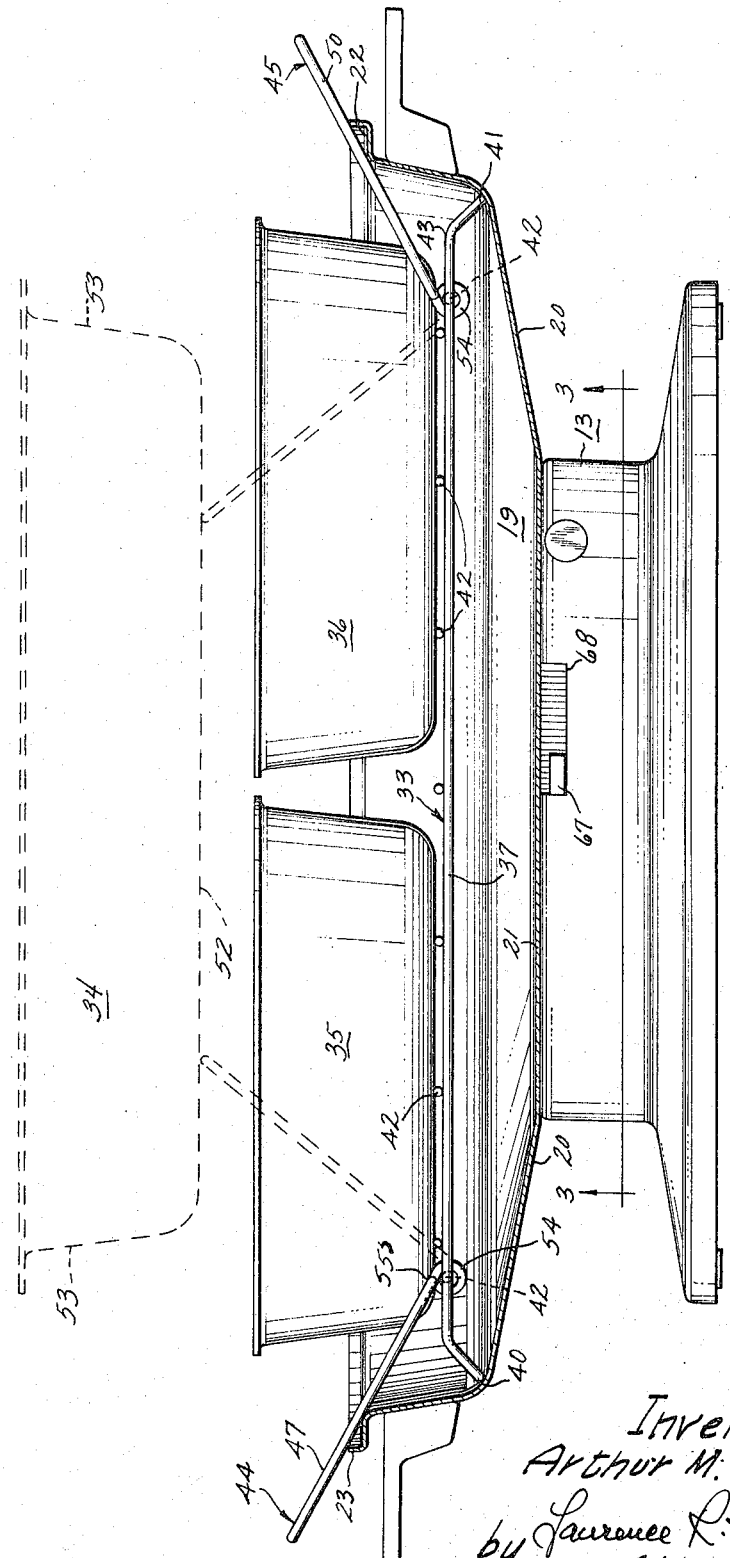

Jan. 23, 1968     A. M. FELSKE     3,364,844
FOOD STEAMER WITH MULTI-LEVEL FOOD SUPPORTING MEANS
Filed May 19, 1966     3 Sheets-Sheet 3
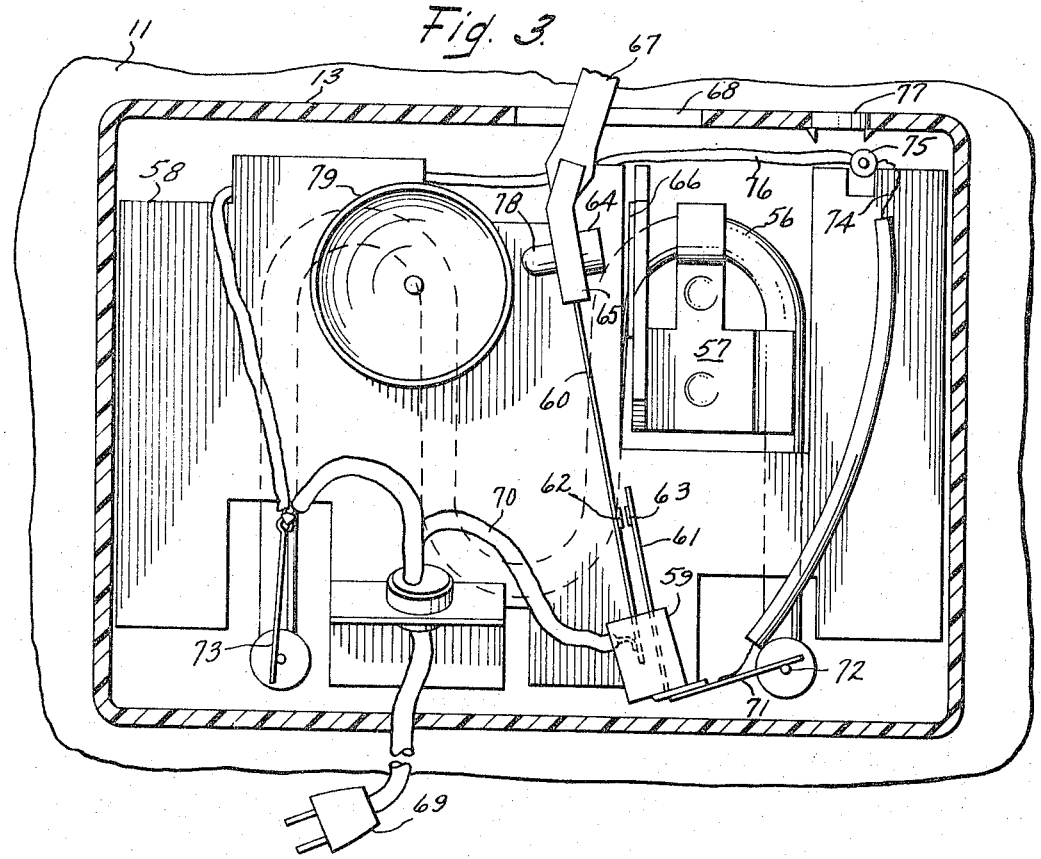
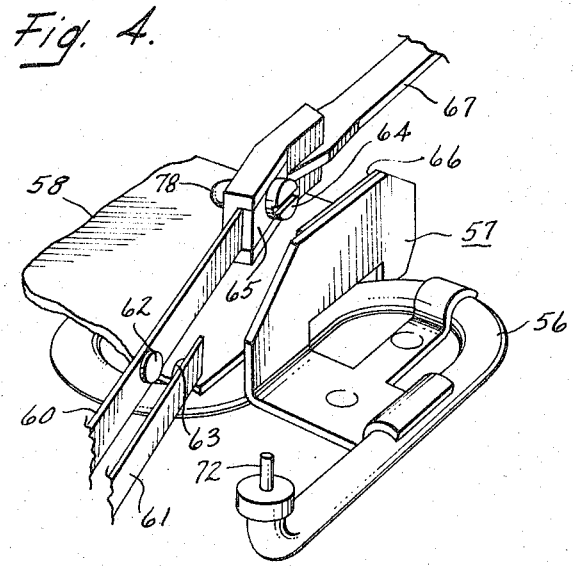
Inventor:
Arthur M. Felske
by Lawrence R. Kempton
Attorney United States Patent Office 3,364,844
Patented Jan. 23, 1968

3,364,844
FOOD STEAMER WITH MULTI-LEVEL FOOD SUPPORTING MEANS
Arthur M. Felske, Westport, Conn., assignor to General Electric Co., a corporation of New York
Filed May 19, 1966, Ser. No. 551,267
5 Claims. (Cl. 99—331)

The present invention relates to food steamers; and, more particularly to means for supporting food to be cooked within the steaming vessel.

There are food steaming vessels in the prior art which are particularly adapted for household use in cooking eggs. Generally, these devices have included a rack which is positioned within the vessel for supporting the eggs thereon. A predetermined measured quantity of water is added to the vessel, depending on the cooking time desired, and this water is boiled to provide the steam necessary for cooking. After the water has boiled away, the heat is automatically terminated and the cooked eggs may be removed from the vessel.

While the racks used in the devices just mentioned are suitable for the purpose intended, they would not be adequate, in themselves, to hold smaller food items such as small vegetables which might fall through the relatively large apertures used to accommodate the eggs. If the vegetables should fall through these apertures and contact the bottom of the vessel, the increased heat from the bottom of the vessel when the water has boiled away may cause an objectionable burning odor to come from these food items. It would be possible, of course, to place the small vegetables in a separate container having a solid bottom, and then place this container on the rack to provide a partial solution to the last-mentioned problem. It remains, however, that the housewife generally desires to serve at least two and quite often three separate food items capable of being steamed and the prior art structures for supporting food within the vessel are not adequate for concurrently supporting and cooking these several food items within a single food steaming vessel while still occupying only a minimum of counter space in the kitchen.

It is therefore an object of the present invention to provide means for supporting food to be steamed within a food steamer whereby the food is supported in containers at separate and distinct levels within the steamer so that different types of food may be cooked at the same time within the vessel while the vessel still occupies a minimum of counter space, the food supporting means is relatively inexpensive, and the likelihood of objectionable odor from burned food is obviated.

Another object is the provision of a rack structure used for supporting food within containers at separate levels within a food steamer wherein the rack, with a minimum of parts, provides the sole support for the containers within the vessel and permits the containers to be readily positioned on the rack without having to tilt the containers.

Briefly stated, in accordance with one aspect of the present invention, means are provided including a supporting rack to support food at two separate and distinct levels within a food steaming vessel. The supporting rack includes a base member which extends between the side walls of the vessel and is adapted to receive a food container on the top surface thereof. A pair of generally U-shaped supporting arms are connected to the base member, and the top of these arms provide means to support a second container above and in spaced relationship to the first container. The second container has a maximum dimension greater than the distance between the top portions of the two supporting arms. Steam coming from the bottom of the vessel can thereby pass around the sides and over the top of each of the containers to contact the food within each of the containers from the top.

As another aspect of the invention, the supporting arms are pivotally mounted on the base so that the arms may be pivoted to a first position where they provide unobstructed access to the top surface of the rack so that a first container may be easily positioned on the rack without having to tilt the container, and the support arms are then capable of being pivoted to a second position whereby a top container may then be placed on the arms, the arms providing the sole support for the top container.

Further features, objects, and advantages will become apparent with reference to the following drawings in which:

FIG. 2 is a front view of the apparatus of FIG. 1, with the cover removed and illustrating by broken and solid lines two positions of the rack supporting arms;

FIG. 3 is a cross-sectional view taken along the line 3—3 in FIG. 2 and illustrating heater and control means; and FIG. 4 is an enlarged perspective view illustrating details of the heater and control means of FIG. 3.

Figure 1:
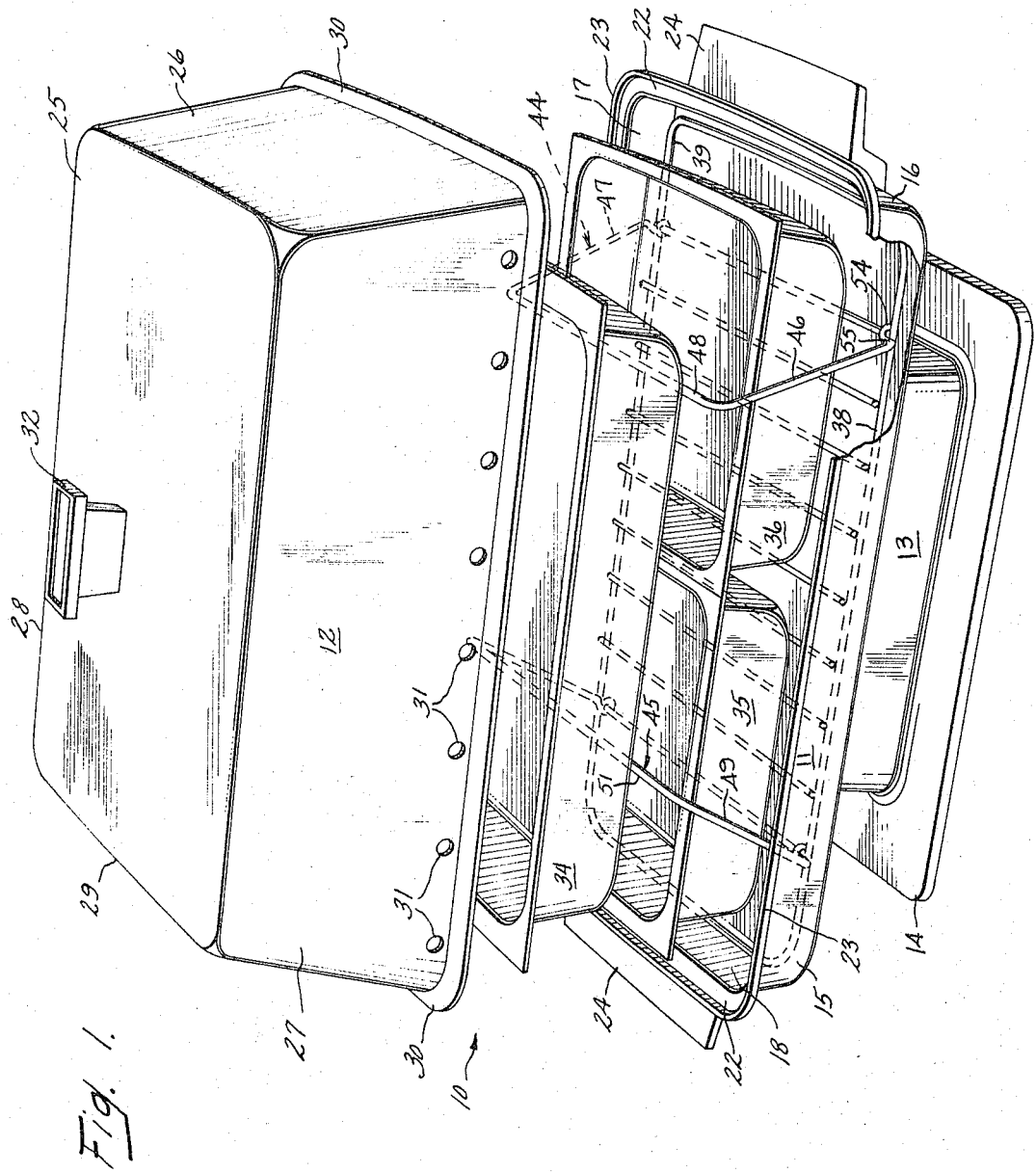
FIG. 1 is a perspective view of a food steamer with the cover raised and parts of the main receptacle broken away to show the food supporting means of the present invention.

Now referring to FIGS. 1 and 2 of he drawings there is illustrated a food steaming vessel 10 which includes a main bottom receptacle 11 and a hollow cover 12. While any suitable material may be used for these latter parts, I prefer to use aluminum. The bottom receptacle is mounted on a supporting stand 13 which includes an enlarged bottom portion 14 to lend stability to the device when placed on a counter or table top. The stand 13 is preferably made of any suitable heat resistant moldable plastic and, in addition to performing a supporting function, is used to house a heater and control means as will be pointed out hereinafter in greater detail.

The receptacle 11 includes opposed generally vertical side walls 15, 16, 17 and 18 and a bottom wall 19. In order to provide assurance that all of the water will boil away in a steaming operation, the bottom wall has outer portions 20 which have a sloping surface so as to direct the water toward a horizontal central portion 21 of the bottom wall. The latter portion 21 is immediately above the heating means. The upper ends of the side walls of the receptacle 11 each include a bend so as to form a shelf or ledge 22 extending substantially perpendicular to the main portion of the side walls. The ledge 22 terminates in an upstanding rim 23. A pair of handles 24 are suitably fastened to the outer surface of sidewalls 16 and 18.

The cover 12 includes a top wall 25 and side walls 26, 27, 28 and 29 defining a hollow interior. The ends of the side walls are each provided with a flange 30 which is complementary in size and shape to the ledge 22 so that when the cover 12 is placed on the receptacle 11, the flange 30 rests on the ledge 22. When the cover is so positioned, the top wall and side walls of the cover 12 together with the bottom wall and side walls of the main receptacle 11 define a steaming compartment. A plurality of apertures 31 extend through the cover to provide for escape of some of the steam when the device is in operation and thereby an excessive build up of pressure within the steaming compartment is prevented. A handle 32 secured to the top wall 25 facilitates removal and placement of the cover.

As indicated above, the important features of my invention reside in the means which I have provided to support the food to be steamed at separate and distinct levels within the steaming compartment. To perform this food supporting function I have provided a rack 33, a top food container 34 and at least one and preferably two bottom containers 35 and 36.

The rack 33 comprises a generally rectangular wire frame base member 37, providing opposed side edges 38 and 39 and opposed end edges 40 and 41. A plurality of spaced wires 42 extend between the opposite side edges 38 and 39 and are welded or otherwise secured thereto to provide an open-work top surface to appropriately receive a food container. Preferably, there are slight downward bends 43 in the base member 37 near the opposite ends of the side edges so as to raise the rack slightly above the level of the outer portions 20 of the bottom wall as seen clearly at FIG. 2. This aids in assuring that the rack will not be immersed in water when a food steaming operation is to begin. As seen clearly in the drawings, the rack 33 is of a size as to be removably received within the receptacle 11, and the opposite end edges of the rack contact the bottom wall 19 at approximately the juncture between the sloping portion 20 and the side walls 16 and 18.

In order to increase the number of food items which may be steamed, a pair of supporting arms 44 and 45 are connected to the base member 37 so as to provide the sole support for top food container 34. The supporting arms are substantially identical to each other in construction, and the arm 44 includes a pair of legs 46 and 47 connected to and extending above the base member 37, and a cross member 48 connecting the legs. Similarly, the supporting arm 45 includes legs 49 and 50 and a cross member 51. The top food container 34 includes a bottom wall 52 and side walls 53. As seen at FIG. 1 and by dotted lines in FIG. 2, the distance between the cross members 48 and 51 is less than the maximum dimension of the bottom wall 52 of the food container 34, and this latter dimension is less than the distance between opposite ends 40 and 41 of the base member 37. The cross members 48 and 51 are in the same horizontal plane with each other; and, as seen at FIG. 1 are spaced from the base member 37 a vertical distance which is greater than the depth of the bottom containers 35 and 36. This structure permits the support arms 44 and 45 to provide the sole support for the top container 34 and there is no interference of the container with the side walls of the steaming vessel. It is to be understood that the depth of the side walls of the cover 12 together with the side walls of the receptacle 11 is sufficient to enclose the containers in a manner such that there is a space remaining between the top of the container 34 and the top wall 25 of the cover when the cover is in place with the flange 30 resting on the ledge 22.

I have found that it is advantageous to pivotally connect the supporting arms 44 and 45 to the base 37 in order that the bottom food containers may be easily positioned on the base without having to tilt the containers. This pivotal connection may be accomplished by bending the end of each leg in substantially a circular bend, indicated by the numeral 54 for each leg, around respective cross wires near opposite ends of the base member. A substantially 90° outward bend is formed in each leg slightly above the pivotal connection, and this latter bend provides an abutment 55 which engages the side wires 38 and 39 of the base member when the supporting arms have been pivoted to the dotted line position of FIG. 2, thereby holding the supporting arms in this position to receive the top container 34. The supporting arms may, however, before any of the food containers are placed on the rack, be pivoted to the position shown in full lines at FIG. 2 where the supporting arms rest against the side walls 16 and 18 of the receptacle. It is important to note that in this latter position, the esupporting arms including the cross members 48 and 51 provide substantially unobstructed access to the entire top surface of the base 37 of the rack so that the containers 35 and 36 can each be positioned on the base without having to tilt the containers. This latter feature becomes all the more important when it is realized that the food containers may often be filled with small food items, such as small vegetables. If the container needed to be tilted for placement on the rack, some vegetables might spill into the bottom 19. Should this spilling be undetected, an objectionable burning odor could arise after the water has boiled away and the bottom wall experiences, for a slight time, a relatively high temperature.

Reference may now be made to FIGS. 3 and 4 in order to understand one type of heater and heater control means which may be used in connection with the apparatus described above. A tubular sheathed heater 56 is secured such as by brazing to the outer surface of the central portion 21 of the bottom wall of the vessel.

An aluminum mounting bracket 57 is then connected to the heater and to the bottom of the steaming vessel such as by brazing so that the bracket is in good heat transfer relation with the heater and with the bottom of the vessel. In order to provide means for mounting other of the control elements, a metal plate 58 is secured to the bottom of the vessel in spaced relationship therewith such as through the medium of any suitable spacing brackets which are brazed to the bottom of the vessel and also to the plate 58.

An electrically insulating block 59 is securely mounted on the plate 58 and a pair of resilient arms 60 and 61 capable of conducting electricity each have one end secured to the insulating block 59. The arms project from the block, and each have an electrical contact 62 and 63 affixed thereto so that these electrical contacts may be engaged or disengaged with each other in a manner to be disclosed hereinafter in more detail. The end of arm 60 remote from the block carries a permanent magnet 64, and the magnet is electrically insulated from the arm through the medium of an insulating spacer 65.

The position of the magnet as seen at FIG. 3 is when the steaming vessel is not in operation. In this position, a keeper plate 66, which is riveted to the bracket 57 is in spaced, but aligned, relationship with the magnet 64. The keeper plate is formed of what is known in the art as a "thermomagnetic" material; that is, a material which his high magnetic permeability when it is cool and up to a certain critical temperature. When, however, this critical temperature is reached, the magnetic permeability decreases rapidly to the so called Curie point where the material will no longer attract a magnet. One suitable "thermomagnetic" material which may be used is a nickel-iron alloy containing between about 32.5 and 36 percent nickel.

In order to permit the user to manually bring the magnet 64 into contact with the keeper plate 66 and thereby close the contacts 62 and 63, an actuator arm 67 is secured to the end of the insulating spacer 65. This arm extends through an opening 68 formed in the supporting stand 13.

The remaining elements in the control system will be referred to in the following description which takes the steaming apparatus through one complete operational cycle.

The user measures a predeterimned quantity of water, and pours the water into the receptacle 11. The more water that is used, the longer will be the steaming time. Now, the rack 33 is positioned in the receptacle, and the supporting arms 44 and 45 are pivoted to a first position, which is the solid line position illustrated at FIG. 2. The bottom containers 35 and 36 which now have been filled with food are easily positioned on the top surface of the base member 37 of the rack; and, as set forth above, they may be so positioned without having to tilt the containers. Now, the support arms are each pivoted to a second position (the dotted line position of FIG. 2). A top food container 34 is positioned so that the bottom wall 52 rests on the cross members 48 and 51 of the arms. The cover 12 is then placed on the receptacle 11, and the food containers are thereby enclosed within the steaming chamber.

The steaming operation may now be initiated by the user moving the magnet 64 through the medium of the actuator arm 67 in the direction of the arrow (FIG. 3) to a position where the magnet engages and is attracted by the keeper plate 66. When this engagement of the keeper and magnet occurs, the contacts 62 and 63 are also engaged. At this point it is to be understood that the resiliency of the arm 60 tends to bias the arm away from the magnet toward the initial position (FIGS. 3 and 4), but this bias is overcome by the attraction between the magnet and keeper plate. Now, assuming that a plug 69 has been inserted in an appropriate household electrical outlet, an electrical circuit can be traced from one side of the power supply through a conductor 70 which is electrically connected to switch arm 60, and through the contacts 62 and 63 and switch arm 61, which latter arm is electrically connected by a conducting wire 71 to a resistance heating element 72 at one end of the tubular heater 56. The other end of the heating wire 72 is electrically connected by a conducting wire 73 to the other side of the power supply. A second circuit in electrical parallel to the heater, leads from conductor wire 71 through an insulated conductor 74 to a indicator light 75. From the indicator light, another conductor 76 leads to the conducting wire 73 so that the indicator light is on when the heater is in operation. The indicator light is visible through an opening 77 in the supporting stand 13.

The heater heats and boils the water causing steam to flow around and over all of the food containers in the chamber. As long as there is water in the chamber the temperature of the bottom wall of the vessel and of the heater 56 will remain at a substantially constant level which is insufficient to affect the permeability of the keeper 66 to a great enough degree to lose its attraction for the magnet 64. When, however, all of the water has boiled away, the temperature of the heater 56 and of the bottom surface 19 of the vessel will increase rapidly. This increased heat is transferred rapidly to the keeper 66 mostly by conduction through the mounting bracket 57. In a short period of time the keeper will reach its Curie point thereby releasing the magnet to return to its original position under the bias of resilient arm 60. As soon as the magnet is released, the arm 60 springs it away from the keeper plate 66, causing an abutment 78 located behind the magnet to strike a bell 79 so as to signal the user that the food is now cooked.

The foregoing is a description of an illustrative embodiment of the invention, and it is applicant's intention in the appended claims to cover all forms which fall within the scope of the invention.

I claim:

1. For use in a food steaming vessel having a bottom wall, a top wall and side walls defining a steaming compartment, a heater for supplying heat to the bottom wall and means for automatically terminating the heat supply when the food has been steamed, the combination of means for supporting the food to be steamed at two separate and distinct levels within the vessel and comprising: a rack including a base member having a top surface and opposed side and end edges, said rack being removably received within said compartment for accommodating a first food container on the top surface of said base member, said rack further including a pair of generally U-shaped support arms each having a pair of legs connected to the base member and a cross member connecting the legs, said two cross members extending between the side edges of the rack and above the top surface thereof substantially parallel to each other in the same plane with each other and spaced apart from each other a distance less than the distance between the opposed end edges of the rack; and a second food container having side walls and a bottom wall with the maximum dimension of the container bottom wall being greater than the distance between the cross members of said support arms for said second container to be supported within said vessel spaced above said first container solely by said support arms.

2. For use in a food steaming vessel having a bottom wall, a top wall and side walls defining a steaming compartment, a heater for supplying heat to the bottom wall and means for automatically terminating the heat supply when the food has been steamed, the combination of means for supporting food to be steamed at two separate and distinct levels within the compartment comprising: a rack including a base member having a top surface and opposite side and end edges and being removably received within said compartment for accommodating a first food container on the top surface of said rack, a pair of substantially identical generally U-shaped support arms each having a pair of legs pivotally connected to said base member and a cross member connecting each pair of legs, said support arms each being pivotable between first and second positions, said support arms in said first position providing substantially unobstructed access to said top surface of the rack for permitting said first food container to be positioned thereon without tilting the container, said support arms in said second position having the cross members spaced apart from each other above the top surface of the base member a distance less than the distance between the end edges of the base member, stop means for holding said support arms in said second position spaced a vertical distance above the top surface of the base member greater than the depth of the first food container; and a second food container having side walls and a bottom wall with the maximum dimension of the container bottom wall being greater than the distance between the cross members for said second container to be supported within said vessel solely by said support arms.

3. The supporting structure as set forth in claim 2 wherein each of said pair of legs in said second position define an acute angle with the portions of the side edges of the base member between the pivotal connections of the two support arms.

4. A rack for use in a food steaming vessel having a bottom wall, a top wall and side walls defining a steaming compartment, and heating means and heat control means for terminating the heat when the food is cooked, said rack comprising: a base member having side and end edges and having openings therethrough and being removably received within said compartment and extending between the side walls thereof; and a pair of generally U-shaped support arms having legs pivotally attached to said base member and each of said support arms having portions connecting the legs, said connecting portions being movable toward and away from each other above the base member between first and second stop positions, said support arms in said first position providing substantially unobstructed access to the entire top surface of the base member for permitting a food container to be positioned on the base without tilting the container, said support arms in the second position each having the connecting portions disposed a distance sufficiently inwardly from the end edges of said rack to permit the bottom wall of a top food container having a maximum dimension less than the distance between the end edges of the rack and greater than the distance between said top portions of said arms in their second position to be placed on and supported solely by said support arms and enclosed within the steaming compartment.

5. The structure as set forth in claim 4 wherein said supporting arms have substantially 90° bends located above the pivotal connection of said arms with said base member, said bends contacting the side edges of said base member to stop said arms in said second position.

(References on following page)

References Cited

UNITED STATES PATENTS

| | | | |
|---|---|---|---|
| 629,127 | 7/1899 | Geer. | |
| 2,101,487 | 12/1937 | Anderson. | |
| 2,503,795 | 4/1950 | Brown | 99—426 |
| 2,761,375 | 9/1956 | Jepson | 99—344 |
| 2,889,054 | 6/1959 | Wheeler | 211—153 |
| 3,147,689 | 9/1964 | Sakamoto et al. | 99—331 |

BILLY J. WILHITE, *Primary Examiner.*